United States Patent [19]

Allan

[11] 4,346,181

[45] Aug. 24, 1982

[54] METHOD OF REDUCING FORMALDEHYDE EMISSIONS FROM FORMALDEHYDE CONDENSATION POLYMERS

[75] Inventor: George G. Allan, Seattle, Wash.

[73] Assignee: Board of Regents, University of Washington, Seattle, Wash.

[21] Appl. No.: 300,037

[22] Filed: Sep. 8, 1981

Related U.S. Application Data

[63] Continuation of Ser. No. 137,990, Apr. 4, 1980, abandoned.

[51] Int. Cl.$^3$ ................................................. C08J 9/30
[52] U.S. Cl. ...................................... 521/136; 521/157; 521/162; 521/187; 521/188; 525/157
[58] Field of Search ............... 521/187, 188, 136, 157, 521/162; 525/157; 260/29.4 UA

[56] References Cited

U.S. PATENT DOCUMENTS

| | | | |
|---|---|---|---|
| 3,215,647 | 11/1965 | Dunn | 521/136 |
| 3,422,038 | 1/1969 | Meyer | 521/136 |
| 3,538,025 | 11/1970 | Roberts et al. | 521/84 |
| 3,743,612 | 7/1973 | Vial | 521/136 |
| 4,005,036 | 1/1977 | Stalego | 521/188 |
| 4,022,741 | 5/1977 | Tuka et al. | 260/29.4 UA |
| 4,246,153 | 1/1981 | Takagishi et al. | 260/29.4 UA |
| 4,251,410 | 2/1981 | Danner et al. | 260/29.4 UA |
| 4,265,795 | 5/1981 | Sekmokos et al. | 260/29.4 UA |

*Primary Examiner*—Morton Foelak
*Attorney, Agent, or Firm*—Seed, Berry, Vernon & Baynham

[57] ABSTRACT

A method of reducing the formaldehyde emissions from formaldehyde condensation polymers is disclosed. A substance having two or more amide linkages, such as a polyacrylamide polymer is incorporated in the polymer solution immediately or shortly before use, the acrylamide polymer reacting with free formaldehyde in the solution or that generated as a result of hydrolytic breakdown of the formaldehyde condensation polymer. The incorporation of polyacrylamide polymers in a urea-formaldehyde resin solution used in the production of urea-formaldehyde insulating foams is of particular benefit.

2 Claims, No Drawings

METHOD OF REDUCING FORMALDEHYDE EMISSIONS FROM FORMALDEHYDE CONDENSATION POLYMERS

This is a continuation of application Ser. No. 137,990, filed Apr. 4, 1980, now abandoned.

BACKGROUND OF THE INVENTION

1. Field of the Invention

This invention relates to a method of reducing the formaldehyde emissions from formaldehyde condensation polymers, particularly urea-formaldehyde polymers, to a resin solution incorporating a substance which reduces the formaldehyde emissions from formaldehyde condensation polymers and to foamed formaldehyde condensation polymers incorporating a substance which reduces the free formaldehyde emission therefrom.

2. Prior Art Relating to the Disclosure

The emission of formaldehyde vapor from particleboard, plywood and insulating foams and other materials made with or incorporating formaldehyde condensation resins, particularly urea-formaldehyde resins, is and continues to be a problem. Numerous methods have been proposed to reduce the formaldehyde emissions from urea-formaldehyde resins. For example, U.S. Pat. No. 4,129,533 discloses substituting one or more aryl dialdehydes having two to eight carbn atoms for 20 percent of the total aldehyde moieties of the urea-formaldehyde resin, the dialdehydes provided as a cross-linking solution at the time of final polymer formation. U.S. Pat. No. 3,979,341 discloses the use of furfuryl alcohol and resorcinol to reduce formaldehyde odor in urea-formaldehyde foams. U.S. Pat. No. 3,231,525 discloses preparation of urea-formaldehyde foams in which the formaldehyde odor is reduced by adding free urea to the hardener solution during manufacture of the foam. Large amounts of calcium lignosulfonates and mineral oil containing sodium silicate have also been advocated for reducing the aldehyde emission of urea-formaldehyde resins. Notwithstanding the methods which have been proposed, it still remains a problem to find a practical and economical means of reducing formaldehyde emission from urea-formaldehyde resins, particularly those used for producing urea-formaldehyde foams used for insulation purposes. Whatever is incorporated in the urea-formaldehyde resin solution must not adversely affect the desired end properties of the foam produced and must be compatible with the ingredients of the foam.

SUMMARY OF THE INVENTION

It is a primary object of this invention to provide a method of reducing the formaldehyde emission from formaldehyde condensation polymers by incorporating in the polymeric resin solution a substance having two or more amide linkages.

It is a further object of this invention to provide a method of reducing the free formaldehyde emissin from urea-formaldehyde polymers by incorporating in the urea-formaldehyde resin solution an amount of a polyacrylamide polymer sufficient to react with the free formaldehyde present initially in the resin or generated subsequently by hydrolytic breakdown of the polymer.

It is a further object of this invention to provide urea-formaldehyde foams used for insulating purposes which incorporate a polyacrylamide polymer in an amount sufficient to reduce or eliminate free formaldehyde emission present initially in the foam or generated subsequently as a result of hydrolytic brakdown of the polymer during use.

These and other objects are accomplished by incorporating into a formaldehyde condensation product resin solution a sufficient amount of a polymer having two or more amide linkages which react with free formaldehyde present in the resin solution or formaldehyde generated as a result of hydrolysis of the condensation polymer during use to reduce liberation of the free formaldehyde.

DESCRIPTION OF THE PREFERRED EMBODIMENTS

Formaldehyde condensation resins, particularly urea-formaldehyde condensation resins, are commonly used in the manufacture of particleboard, interior plywood and urea-formaldehyde foams. Urea-formaldehyde foams have found broad acceptance in Europe and the United States as excellent insulation in both home and industrial applications. Urea-formaldehyde resins used in the manufacture of urea-formaldehyde foams are generally formulated to produce a rapidly setting, low density foam ahving a low degree of shrinkage. Such foams are made by mixing together two main components with aeration, the components including (1) an aqueous solution of a urea-formaldehyde resin and (2) an aqueous solution of a surfactant and a strong acid curing agent or catalyst. Resin foams prepared in this manner are injected into the walls of dwelling units with a specially designed gun. The resins rapidly gel within the walls of the dwelling unit to produce a highly cross-linked and insoluble polymer. The formation of the polymer network is a result of the high functionality of the urea whose four hydrogen atoms react with the hydroxyl groups of methylene glycol, the hydrate of formaldehyde existing in an aqueous solution thereof. Typically, the urea-formaldehyde resins used have a molar ratio of urea to formaldehyde ranging from 1:1 to 1:2, preferably 1:1.3 to 1:1.6. There is generally some reactant monomer in the finally cured urea-formaldehyde resin either in foam form or as an adhesive, this monomer present as free formaldehyde or as an N-methylol moiety at the polymer chain ends. Urea-formaldehyde foams injected into the walls of dwelling units, because of the varying degrees of temperature and humidity to which the foam is exposed, emits free formaldehyde as a vapor which can cause objectionable odors. The acid catalyzation of urea-formaldehyde resins which are mildly alkaline at the outset, creates a resin solution which is strongly acidic and which contains water. When such resins are foamed, a strongly acidic foam results which contains a great amount of water. Over a period of time the urea-formaldehyde resin making up the foam starts to dry out, causing the concentration of the acid in the water within the foam to increase. This acidity is responsible for the breakdown of the foam and the liberation of free formaldehyde. By incorporating a latent base in the urea-formaldehyde resin which is compatible with the ingredients of the resin and does not adversely affect the resin or its desired properties, the residual acidity of the foam is neutralized and any free formaldehyde generated as a result of hydrolysis is reduced.

The amide substance added to the resin solution may be a polymer containing a multiplicity of amide linkages which can be conveniently incorporated into the urea-formaldehyde resin before use and which is compatible with the cured urea-formaldehyde resin or foam without adversely affecting the mechanical strength properties of the resin or it may be a diamide or triamide such as biuret or triuret. Preferred are polymers containing acrylamide, methacrylamide or a combination of the two, the acrylamide polymer having the formula:

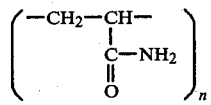

wherein n=2 to 10,000. Of the family of polyacrylamide polymers available, those having a molecular weight of less than about 20,000 are preferably used. The molecular weight should be sufficiently low so that when it is added to urea-formaldehyde resin solutions used for foaming, the foam is not too viscous. The amount of amide substance added to the resin solution should be sufficient to reduce the free formaldehyde content of the resin and scavenge any free formaldehyde generated during use of the polymer by hydrolytic breakdown. Generally, the amount of polyacrylamide polymer ranges from 0.2-20 percent by weight based on the anhydrous weight of the urea-formaldehyde resin. Such polymers are readily available, nontoxic and water soluble. Polyacrylamide incorporated in the resin solution not only traps free formaldehyde by reaction therewith, but neutralizes residual acidity of urea-formaldehyde foams produced from such resin solutions. It also reduces the shrinkage of such urea-formaldehyde foams by reducing the tendency of water contained within the foam to migrate from the foam. It was found that incorporation of 5 percent of a commercial polyacrylamide polymer (Accostrength 86) based on the dry weight of the urea-formaldehyde into a typical, commercially produced urea-formaldehyde resin which was then foamed, exhibited a 100-fold reduction in formaldehyde emission relative to similar urea-formaldehyde foam incorporating no polyacrylamide.

The following examples illustrate this invention but are not intended to be limiting in any way.

EXAMPLE 1

The components used to prepare foam were a commercial grade urea-formaldehyde resin (7.2, solids 65%) and a phosphoric acid based foaming agent-hardener.

Small amounts (100 g) of foam were conveniently prepared at 20° C. in a Waring blender by rapid agitation of a mixture of the urea-formaldehyde resin (55 mL), water (47.5 mL) and diluted foaming agent-hardener (2.5 mL) for 60 sec. Larger samples (1000 g) of foam were obtained using commercial foaming equipment (Isoschaum Model 125 from Rapperswill Corp., N.Y., N.Y.) and standard techniques of operation. Prior to testing, all foams were equilibrated under the same conditions (24° C., 90% rh, 24 h) and then ground in a Waring blender.

The polyacrylamide used was a commercial Accostrength 86 resin of American Cyanamid Co. (Wayne, N.J.). An acrylamide/acrylonitrile copolymer (molar ratio 1:1) was prepared according to the procedure of T. Skwarski, T. Wodka and J. Dutkiewiez described in Polimery, 1971, 16 (12), 63.

In the case of the samples modified with polyacrylamide, or the acrylamide-acrylonitrile copolymer, the respective additives were dissolved in a diluted aqueous solution (1:20) of the foaming agent-hardener each in an amount of 2 g/100 mL prior to foaming. Prior to testing, all foams were equilibrated under the same conditions (24° C., 40% rh).

The content of free formaldehyde and free formaldehyde in the foam samples was determined by a modified bisulfite method.

A stream of air (500 mL/min) at a temperature of 55° C. and 90% relative humidity waas passed upwards through a glass column containing a sample (10-20 g) of ground foam. The exiting gas, conducted through polyfluoroethylene tubing, was bubbled into water (80 mL), maintained at 15° C.), which was subequently periodically analyzed for dissolved formaldehyde using the chromtograpic acid procedure.

The total amount of formaldehyde emitted by the conventional foam with no incorporated polyacrylamide increased steadily. The amount emitted per gram of foam was 1, 2, 3 and 4.2 mg at the corresponding elapsed times of 5, 11, 17 and 30 days. In surprising contrast, the total amount of formaldehyde emitted from the polyacrylamide-containing foam was 0.08, 0.12, 0.16 and 0.18 mg at the elapsed times of 5, 11, 17 and 26 days. The copolymer of acrylamide and acrylonitrile was less efficient in preventing formaldehyde emission. The total amount of formaldehyde emitted in this case was 1, 2 and 2.9 mg at elapsed times of 10, 19 and 29 days, respectively.

EXAMPLE 2

A commerical particleboard containing 6% urea-formaldehyde resin was obtained from Wyerhaeuser Company. A sample (30×3×1 cm) exposed to a temperature of 35° C. and a relative humidity of 90% emitted 679 mg of formaldehyde per Kg of board over a 36-day period.

Another sample of the same particleboard was then painted with a solution of commercial chitosan (obtained from Kypro Company of Seattle, Wa.) in acetic acid. Chitosan is an aminopolysaccharide. Various substances reactive to formaldehyde were incorporated into the chitosan solution and applied to additional particleboard samples. The substances used included urea and thiourea at a level of 0.5 mole per molar glucosamine unit or chitosan. These additives had little or no additional effect on the emission of formaldehyde. In contrast, the inclusion of biuret (NH$_2$CONHCONH$_2$), a diamide, was incorporated into the chitosan solution at the same molar concentration. The particleboard sample was again exposed to 35° C. and rh 90%. The reduction of formaldehyde emission was 83.1% over a 36-day period.

I claim:
1. A method of reducing formaldehyde emissions from a foamable aqueous solution of a urea-formaldehyde condensation polymer, consisting essentially of:
   providing an aqueous urea-formaldehyde polymer having a molar ratio of formaldehyde to urea ranging from 1:1 to 1:2.5, and
   incorporating in the urea-formaldehyde polymer a minor amount of an acrylamide polymer selected from the group consisting of acrylamide and methacrylamide or a combination of the two which react with free formaldehyde present in the urea-formaldehyde polymer or formaldehyde generated as a result of hydrolysis of the polymer during use to reduce liberation of free formaldehyde from the polymer.
2. The method of claim 1 wherein the amount of acrylamide polymer, based on the anhydrous weight of the condensation polymer, ranges from 0.2 to 20 percent by weight, with the urea-formaldehyde polymer making up the remainder.

* * * * *